United States Patent [19]

Eschbach et al.

[11] Patent Number: 5,245,678
[45] Date of Patent: Sep. 14, 1993

[54] IMAGE CONVERSION WITH LOSSY ADAPTIVE ERROR DIFFUSION

[75] Inventors: Reiner Eschbach, Webster; Louis D. Mailloux, Fairport, both of N.Y.

[73] Assignee: Xerox Corporation, Stamford, Conn.

[21] Appl. No.: 811,271

[22] Filed: Dec. 20, 1991

[51] Int. Cl.$^5$ ............................................. G06K 9/38
[52] U.S. Cl. ...................................... 382/50; 358/466; 358/455
[58] Field of Search ........................ 382/50, 51, 53; 358/456, 466, 455

[56] References Cited

U.S. PATENT DOCUMENTS

| | | | |
|---|---|---|---|
| 4,651,287 | 3/1987 | Tsao | 364/519 |
| 4,654,721 | 3/1987 | Goertzel et al. | 358/283 |
| 4,668,995 | 5/1987 | Chen et al. | 358/282 |
| 4,742,553 | 5/1988 | Irwin | 382/47 |
| 4,783,838 | 11/1988 | Matsunawa | 382/51 |
| 4,811,239 | 3/1989 | Tsao | 364/519 |
| 5,008,950 | 4/1991 | Katayama et al. | 358/455 |
| 5,045,952 | 9/1991 | Eschbach | 358/447 |
| 5,077,812 | 12/1991 | Kanno et al. | 382/50 |
| 5,087,981 | 2/1992 | Ng et al. | 382/50 |

OTHER PUBLICATIONS

A Fast Algorithm for General Raster Rotation, Graphics Interface '86, A. Paeth, p. 77ff. (1986).
On the Error Diffusion Technique for Electronic Halftoning, by Billotet-Hoffmann and Bryngdahl, Proc. SID vol. 24/3, 1983, pp. 252-258.
An Adaptive Algorithm for Spatial Greyscale, Floyd and Steinberg, Proc. of the S.I.D. 17/2, 75-77 (1976).

Primary Examiner—Joseph Mancuso
Assistant Examiner—Steven P. Klocinski
Attorney, Agent, or Firm—Mark Costello

[57] ABSTRACT

Gray level pixel values in an image, each pixel value represented by c levels are quantized by applying a threshold level to each pixel value in the image to produce a pixel value having d levels, and applying a weighted portion of the value of the difference (the "error") between the pixel value and the thresholded value to a predetermined set of neighboring pixels; for each neighboring pixel in the predetermined set to which the error term is to be applied, comparing the value of the neighboring pixel to each possible legal output value, and if any pixel value the predetermined set of neighboring pixels is equal to one of the legal output values, then the error term is not applied to that term, and is applied to remaining non-legal values. If all the neighboring pixels have legal values, a decision is made based on a look-ahead neighborhood (a set of pixels used to determine the fractional error allocation) as to whether the error term is discarded or preserved. In the most simple case, the look-ahead neighborhood is identical to the error distribution neighborhood (the set of pixels to which a fractional error can be distributed) and the error term is discarded when all of the neighboring pixels have legal output values. In a more general case, the look-ahead neighborhood extends over an area larger than the error neighborhood, and the error term is only discarded when additional criteria are met, e.g. when all pixels in the larger look-ahead neighborhood have legal values.

9 Claims, 7 Drawing Sheets

IMAGE CONVERSION WITH LOSSY ADAPTIVE ERROR DIFFUSION

This invention relates to quantizing gray data using a lossy adaptive error diffusion technique in image conversion.

CROSS REFERENCE

Cross reference is made to co-pending U.S. patent applications Ser. Nos. 07/396,272, now U.S. Pat. No. 5,045 952 entitled, "Edge Enhanced Error Diffusion Algorithm" by R. Eschbach and 07/600,542, now abandoned entitled, "Method for Making Image Conversions With Error Diffusion" by R. Eschbach, both assigned to the same assignee as the present invention.

BACKGROUND OF THE INVENTION

Image information, be it color or black and white, is commonly generated in a bitmap format at a particular scale, orientation $\Theta$ and resolution $K \times L \times b$, corresponding to a desired printer output, where K is a number of spots per unit length in one dimension, L is a number of spots per unit length in the other dimension, and b is the depth of each pixel, in number of levels. This bitmap is present for every color separation of an output device, i.e., 4 bitmaps for a 4-color output device, 3 for a 3-color device, 2 for a 2-color device and 1 for a black and white output device. In a common example of a black and white output, image data comprising a bitmap to be printed is provided to a printer suitable for printing at 300 spots per inch (spi) in both dimensions, at a one bit depth, giving 2 levels. Many considerations drive this single selection of resolution, including the desirability of providing only a limited number of fonts (alphanumeric bitmaps) so as to use only a limited amount of storage space. Common software packages available on personal computers or for operation of input scanners for document creation are also usually provided with only a single resolution output. Images are commonly arranged at a fixed orientation $\Theta$.

Increasingly, the resolution available from printers varies over a wide range of choices. Printer resolutions are available over a range, for example, from less than 200 spi to more than 600 spi. Resolutions vary for a number of reasons, generally related to the quality of the output image. Simply printing a 300 spi bitmap at 400 spi or 600 spi is undesirable however, since the image will be reduced substantially in size on the output page or display (a practice commonly called scaling). It would be highly desirable to provide the capability of printing any image at any resolution, while selecting the output size and orientation.

It is a common practice to implement conversion of a bitmap of first resolution $K \times L \times b$ to a bitmap of second resolution $M \times N \times d$ through simple pixel level and raster level operations, such as pixel doubling. Pixel doubling is undesirable at the binary level (where printing is commonly done, with binary printers) because of a tendency to distort pixel relationships.

Conventional rotation of bitmaps is accomplished by moving groups of adjacent pixels along the fast scan direction by pixel distances in the slow scan direction, in accordance with their position with respect to the beginning of the scan line and thereby does not change the distribution of the image values, and will commonly produce moiré or other artifacts.

A primary problem of the art is that the density in any given area of coverage is not maintained with pixel doubling or similar methods. Thus, image artifacts which give the image a different appearance are noted in the resolution-converted and/or rotated image.

These problems are less severe in the non-binary case, where scaling for 8 bit (256 levels) images is commonly done using gray level interpolation. These techniques can be applied to binary images by treating them as gray level images, resulting in a number of output levels far exceeding the number of allowed levels. Rotation of images may be accomplished using the three shear rotation method described in "A Fast Algorithm for General Raster Rotation", Graphics Interface '86, A. Paeth, p. 77 ff. (1986) or any other standard image rotation method by treating the input bitmap as a gray image having say 8 bits per pixel, and thereby creating an 8 bit rotated image which, in general, has a different distribution of values than the input, e.g. an image with only values of 0 and 1 will, in general, result in an image with a large number of pixels having values unequal to either 0 and 1.

Algorithms that convert gray images to binary or other number of level images attempting to preserve the local density exist in applications separate from image conversion. These and similar methods might be applied as one part of methods of image conversion. One method, which can be used to prepare an image at a given resolution and level depth of $K \times L \times c$ for printing on a printer with resolution $K \times L \times d$, is error diffusion as described in "An Adaptive Algorithm for Spatial Greyscale, by Floyd and Steinberg, Proc. of the S.I.D. 17/2, 75-77 (1976). Another, more elaborate method would be the error diffusion techniques of U.S. patent application 07/396,272, entitled, "Edge Enhanced Error Diffusion Algorithm" by R. Eschback and the error diffusion techniques described in 07/600,542, entitled, "Method for Making Image Conversions With Error Diffusion" by R. Eschbach, both assigned to the same assignee as the present invention.

U.S. Pat. No. 4,651,287 to Tsao and U.S. Pat. No. 4,811,239 to Tsao disclose a technique which uses an error diffusion algorithm to produce high quality images wherein the gray scale values are compared to the discrete gray scale values of a reference printed array to produce a corresponding error array. U.S. Pat. No. 4,668,995 to Chen et al. discloses a quantization error diffusion algorithm for transforming a multi-bit image into a binary image by diffusing a propagation error among neighboring blocks of pixels. U.S. Pat. No. 4,654,721 to Goertzel et al. suggests printing of gray data on a binary printer, where the gray data is normally of a lower resolution and one takes one gray pixel and transfers it into one 'dot', i.e. a number of binary pixels in the output. Goertzel determines the form and location of those dots using error diffusion and edge enhancement. U.S. Pat. No. 4,783,838 to Matsunawa discloses a multi-step technique which first divides the binary image into blocks of pixels in order to generate a gray-tone representation of the image. Image processing and enhancement can be performed on these blocks and the processed blocks are then converted to the output bitmap using a conventional threshold matrix. U.S. Pat. No. 4,742,553 to Irwin teaches mapping of similarly sized input and output pixel groups, and the use of an error passing process to account for thresholding errors in a resolution conversion process.

In U.S. patent application Ser. No. 07/600,542, a form of error diffusion was proposed in which weighted portions of the error term occurring in the thresholding step of the error diffusion process are directed to adjacent pixels depending on whether the adjacent pixels are gray, or already black or white (legal values, in binary printing), or distributed corresponding to a fixed weighting scheme if all the adjacent pixels are already black or white to use the binary case as an example. While useful results are obtained in a number of image conversions using this method, an image defect is noted at the end of long single bit lines at certain conversion ratios. This artifact, sometimes known as a teardrop because of its appearance, is unsightly and undesirable. Additionally, in the application of documents, it is often undesirable to correct the density errors made in one object, e.g. character, by compensating another object or character that is separated by white space (legal values).

SUMMARY OF THE INVENTION

In accordance with the invention, there is provided a quantizing method and apparatus wherein a pixel defined by one of a large number of possible levels of optical density is redefined at one of a smaller number of levels of optical density, using a lossy and adaptive error diffusion method.

In accordance with one aspect of the invention there is provided a method of quantizing pixel values in an image formed by a plurality of pixels, each pixel representing an optical density of the image at a location within the image, and having an original optical density value selected from one of a set of 'c' original optical density values that has a number of members larger than a desired output set of 'd' optical density values, the steps comprising: for each pixel in the image, adding an error term from an error storage buffer for the pixel to the original optical density value thereof to derive a modified optical density value for the pixel; determining from the modified optical density value of the pixel an output optical density value from a set of possible output optical density values, each member of the output set of 'd' optical density values selected from a set of legal output values which may be reproduced by an output device; determining for the pixel an error that is a difference between the determined output optical density value and the modified optical density value; for each pixel in a predetermined set of neighboring pixels to which the determined error may be added, comparing the original optical density value of each pixel in the set of neighboring pixels to each value of the set of legal output values, identifying pixels that do not have legal values as error recipients, determining a fractional error for each pixel that may receive error, and adding the error in the error storage buffer for subsequent addition of an error term to the original optical density value of each pixel to which error will be added; for a predetermined set of neighboring pixels in which every pixel in the neighboring set has an original optical density that is a legal value, comparing the original optical density value of each pixel in a look ahead set of pixels, including at least the pixels in the neighboring set of pixels, to each value of the set of legal output values, and if at least one pixel in the look head set has a non-legal value, calculating an individual error fraction term that is some portion of the error term and updating the appropriate error storage buffer for each pixel in the predetermined set of neighboring pixels; and if all the pixels in the look ahead set have legal output values, resetting the error to zero.

In accordance with another aspect of the invention there is provided a method of providing image conversion, for converting an original image having at least one bitmap represented by a function b(x,y), where x and y are axes along which the images defined oriented at Θ in reference to an arbitrary axis, the bitmap defined at a resolution of K pixels per unit length by L pixels per unit length (K×L) and a pixel depth b, to a second image having M pixels per unit length by N pixels per unit length (M×N) and pixel depth D, oriented at Φ, in reference to the same arbitrary axis, comprising the steps of: deriving an image function P(x,y) from b(x,y) by simulating an output function operating on b(x,y) to derive a spatial and level resolution sufficient to describe the effects of the output function on b(x,y) at Φ; deriving an image function O(v,w) from P(x,y) each pixel of O(v,w) having a value defined by C levels and a resolution of M×N at Φ, the value of each pixel of O(v,w) derived by determining for each pixel in O(v,w) the weighted optical density value of the pixel O(v,w) through the use of one or more pixels of P(x,y) in the vicinity of the pixel of O(v,w); and reducing the number of levels C defining the pixel values in O(v,w) by thresholding each pixel value in O(v,w), to produce an output pixel value having D levels, and applying the weighted value of the difference between the output value having D levels and the input value having C levels to a plurality of neighboring pixels, generating modified values having C levels, which are considered input pixel values for future pixels, to produce a function B'(v,w) having a resolution of M×N at Φ and pixel depth D, where for each neighboring pixel in the predetermined plurality to which the weighted difference values to be applied, the value of each of the predetermined set of neighboring pixels is compared to each legal output value, and if any pixel value of the predetermined set of neighboring pixels is equal to one of the legal output values, then the value of the differences is not applied to that pixel. If all neighboring pixels have legal values, a decision is made based on the look ahead neighborhood on whether the error is discarded or spread onto the neighboring pixels in a predetermined way.

In accordance with yet another aspect of the invention, in a simpler processing method, the totality of the error term derived from a pixel is directed to the first pixel that will be processed within the set of neighboring pixels, when the pixel value is unequal to any legal value.

These and other aspects of the invention will become apparent from the following descriptions to illustrate a preferred embodiment of the invention read in conjunction with the accompanying drawings in which.

Figure 1:
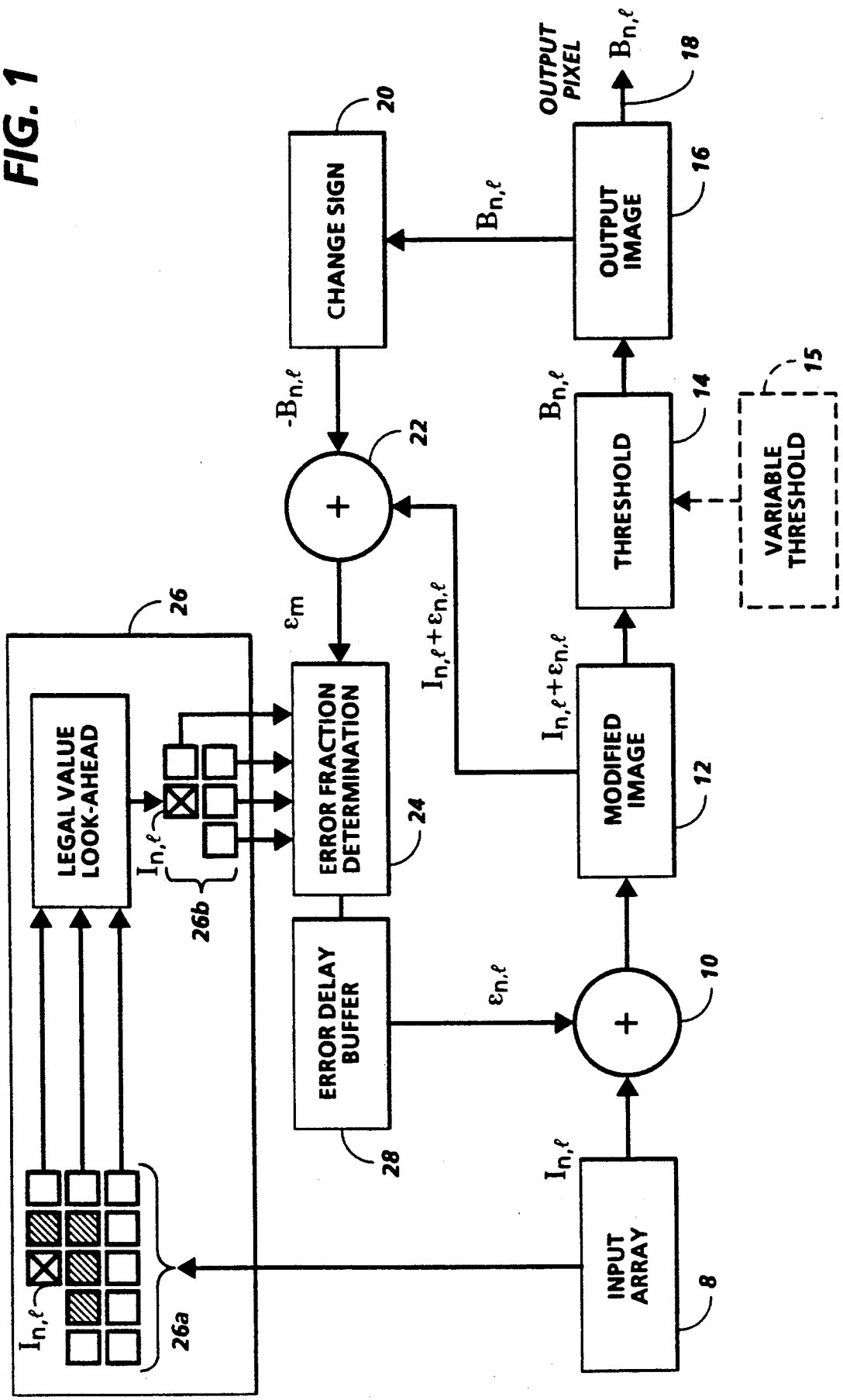
FIG. 1 is a block diagram of a basic system for carrying out the present invention.

Referring now to the drawings where the showings are for the purpose of describing a preferred embodiment of the invention and not for limiting same, a basic system for carrying out the present invention is shown in FIG. 1. In the present case, gray level image data from image input 8 may be characterized as image data, each pixel of which is defined at a single level or optical density in a set of optical density levels, the number of members in the set of levels being larger than desired. Each pixel will be processed in the manner described hereinbelow, to redefine each pixel in terms of a new, smaller set of levels. Here, color data may be represented by a number of independent channels which are handled independently, or the color data might be represented as vector data in a predefined color space, e.g.: RGB, CIELab etc., being submitted to vector operations in the thresholding, error calculation and correction. One common case of this method includes the conversion of data from a relatively large set of gray level values to one of two legal or allowed bin values for printing in a binary printer. In the following the term optical density will be used to denote the above-listed quantities, or any other quantity used to describe the image data.

An input image of the type to be processed as hereinafter described may be represented by a set of gray values (gray level pixels) arranged in an array of L lines, each line containing N gray values with depth b. Gray values are typically expressed as integers, with one example falling in the range from 0 to 255, although greater or lesser number of levels, as well as noninteger representations, are possible. An output image is considered to consist of pixels, each pixel corresponding to an output dot or element that is printed by a digital printer or display.

With reference to FIG. 1, a stored array of input image data or pixels 8, which may be any source of image data, directs input image I into the system on a pixel-by-pixel basis, where n, l represents the position of a single pixel $I_{n,l}$ in the stream of image data. $I_{n,l}$ refers in this description to both the pixel that is positioned at n,l in the image stream, and the intensity of the pixel at position n,l. Each input pixel has a corresponding error term or value $\epsilon_{n,l}$ added to the input value $I_{n,l}$ at adder 10, where $\epsilon_{n,l}$ is a sum of error values of previous pixels to be directed to $I_{n,l}$, resulting in a modified image, represented by modified pixel values, temporarily stored at block 12. The modified image, the sum of the input value and the error value of previous pixels ($I_{n,l}+\epsilon_{n,l}$), is passed to threshold comparator 14. The modified image is compared to threshold value(s) T, to determine an appropriate output value $B_{n,l}$ for pixel $I_{n,l}$ such as for example, in a binary output image, a spot or no spot. The threshold value applied may be constant throughout the image or may vary either randomly, in accordance with a dither pattern, as shown in "On the Error Diffusion Technique for Electronic Halftoning" by Billotet-Hoffmann and Bryngdahl, Proc. SID Vol. 24/3 1983 pp. 252-258, or in accordance with input information as taught in U.S. Pat. No. 5,045,952 to Eschbach, or in accordance with any other predetermined threshold variation. The possible application of variable threshold information is represented by the dashed variable threshold source 15. Once output pixel $B_{n,l}$ is determined and directed to output image storage 16 for eventual transfer to an output along line 18, the value of $B_{n,l}$ is subtracted from the modified image value ($I_{n,l}+\epsilon_{n,l}$) to generate an error level $\epsilon_m$ from pixel $I_{n,l}$. The substraction operation is represented by the change sign block 20 and subsequent adder 22, with $\epsilon_m$ representing the difference between the modified image value ($I_{n,l}+\epsilon_{n,l}$) and the output value $B_{n,l}$ stored to error fraction determination storage 24, where weighted portions of error $\epsilon_m$ are calculated based on the information from the Legal Value Look-Ahead block 26.

The Legal Value Look-Ahead block 26 stores the information about the look-ahead area 26a and the error distribution area 26b with relation to the current input pixel $I_{n,l}$ in both look-ahead and error distribution areas. Note that the size or number of future pixels comprising areas 26a and 26b are given for clarity only, and that both areas are not limited to the actual areas shown in FIG. 1. The function of the Legal Value Look-Ahead block is to determine which pixels in the error distribution area can receive error portions. This is done by first examining the subset of pixels in the look-ahead area that is also a member of the error distribution area. Every member of this set having an original pixel value different from any of the legal output values, is identified as being a valid error recipient to the Error Fraction Determination block 24. The error distribution area 26b is a subset of the look-ahead area 26a, marked by the highlighted pixel set in 26a. If all pixels in this subset have legal values, the remainder of the Look-Ahead area pixels are examined to determine whether the error is discarded (i.e., no pixel is signaled as valid error recipient) or distributed to the error distribution area in a predetermined way (a predetermined set of pixels of 26b are signaled as possible error recipients).

The function of the Error Fraction Determination block 24 is to calculate the fractional error for the pixels in the error distribution area based on the information from the Legal Value Look-Ahead block. For this purpose, a set of fractions or weights is stored in the Error Fraction Determination block and the error $\epsilon_m$ is multiplied by the corresponding weights and the result is used to update the error for the unprocessed pixels stored in the Error Delay Buffer 28. Commonly, although not necessarily, error $\epsilon_m$ will be directed on a weighted basis to a number of neighboring pixels. Accordingly, each cell in the Error Delay Buffer may hold the sum of a number of weighted error values from a plurality of pixels, so that error value $\epsilon_{n',l'}$ applied to any pixel $I_{n',l'}$ is the sum of several weighted error values.

Figure 2:
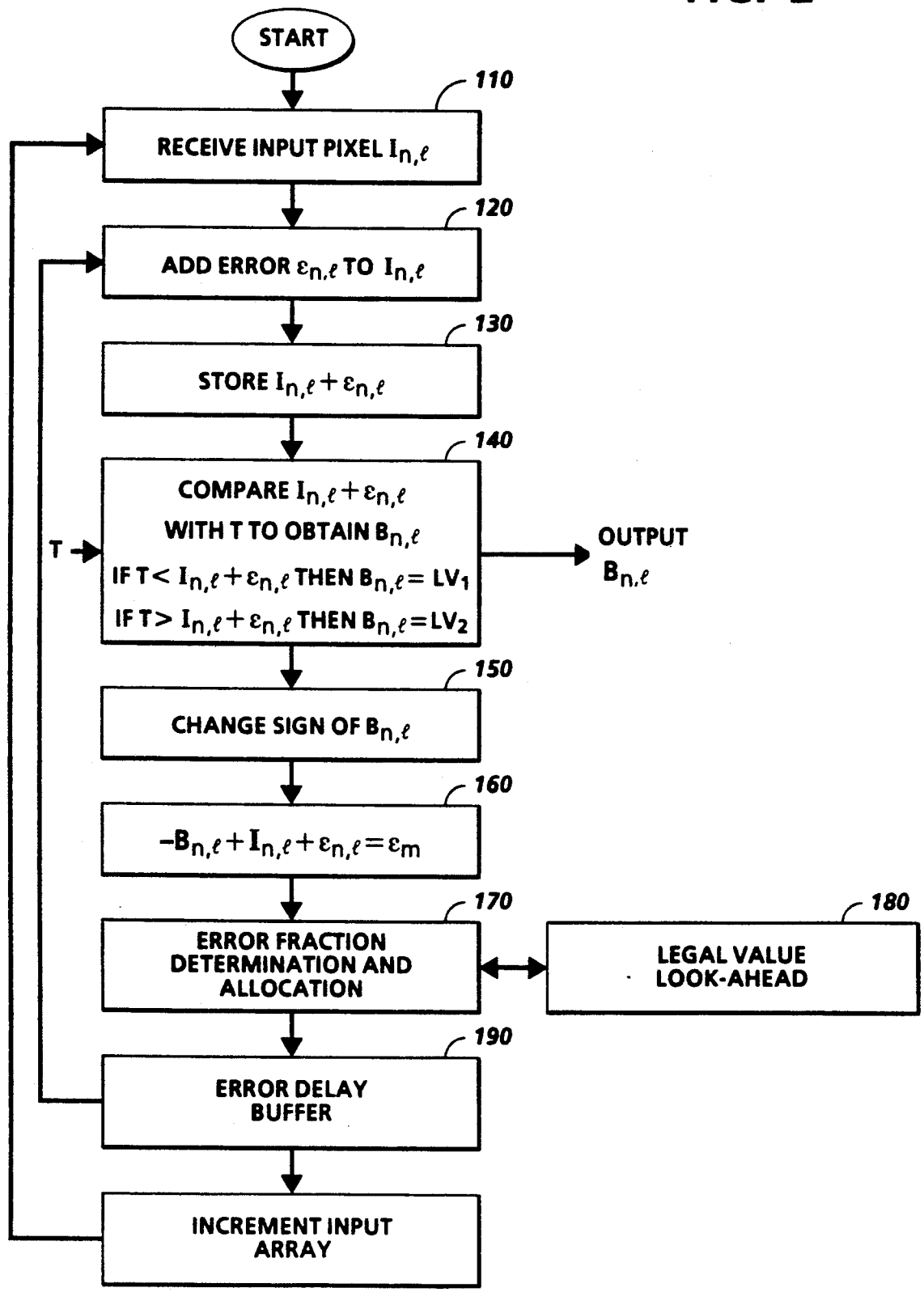
FIG. 2 is flow chart demonstrating the adaptive lossy error diffusion process.

FIG. 2 is a flow chart describing the process of the invention, where steps 110, 120, 130, 140, 150, 160, 170 and 190 are a standard error diffusion method of: 110) taking an input pixel having a value $I_{n,l}$; 120) adding an error term $\epsilon_{n,l}$ from the error delay buffer to the pixel value $I_{n,l}$; 130) storing the value $I_{n,l}+\epsilon_{n,l}$ as a modified pixel value; 140) thresholding the modified pixel value to obtain a new output value $B_{n,l}$ and directing $B_{n,l}$ to an output; 150) changing the sign of output value $B_{n,l}$; 160) adding $-B_{n,l}$ to $I_{n,l}+\epsilon_{n,l}$ to obtain quantizing error $\epsilon_m$, 170) determining the weighted error for each of the currently unprocessed pixels to which error in the quantization of pixel $I_{n,l}$ is to be directed, and 190) updating an Error Delay Buffer holding the errors that are added to the future pixels at step 120. In accordance with the invention, at step 170, the determination and allocation of the fractional error is now subject to an additional input symbolized by block 180, in contrast to the error diffusion methods commonly taught. This Legal Value Look-Ahead block determines which of the future pixels are possible target pixels for an error transfer. Therefore, a determination is made as to whether any of the pixels in the look-ahead set $L_{n,l}$ that are possible targets for an error transfer, i.e. the subset $E_{n,l}$, have a value equal to $LV_i$, where $LV_i$, represents all values equal to legal output values of an output device. For the common binary case this would yield $LV_1=0$ and $LV_2=1$. If none of the pixels in the set $E_{n,l}$ has a value equal $LV_i$, a standard error diffusion process is used, where quantizing error $\epsilon_m$ is directed to pixels in set $E_{n,l}$ in accordance with a standard error diffusion weighting, $K_{1\epsilon}$ for pixel $I_{n+1,l}$; $K_{2\epsilon}$ for pixel $I_{n-1,l+1}$; $K_{3\epsilon}$ for pixel $I_{n,l+1}$; and $K_{4\epsilon}$ for pixel $I_{+1,l+1}$, where $K_1+K_2+K_3+K_4=1$, and are used to update the error delay buffer until the appropriate pixel passes the initial error addition position at step 120. Alternatively, if at step 180, some of the pixels are determined to have legal values, the weightings K are changed at step 170 so that error is directed only to those pixels having non-legal values. However, after determining that some of the pixels have legal values, additional determination steps are provided inside 180, where if all of the pixels in $E_{n,l}$ are determined to have legal values, the whole Look-Ahead set $L_{n,l}$ is examined to determine whether the error is discarded or distributed through a predetermined pixel set. If all pixels in the larger set $L_{n,l}$ have legal values, the error is discarded. In the most simplest case, $L_{n,l}$ and $E_{n,l}$ are identical and the error is discarded when all members of the set have legal values $LV_i$.

Figure 3:
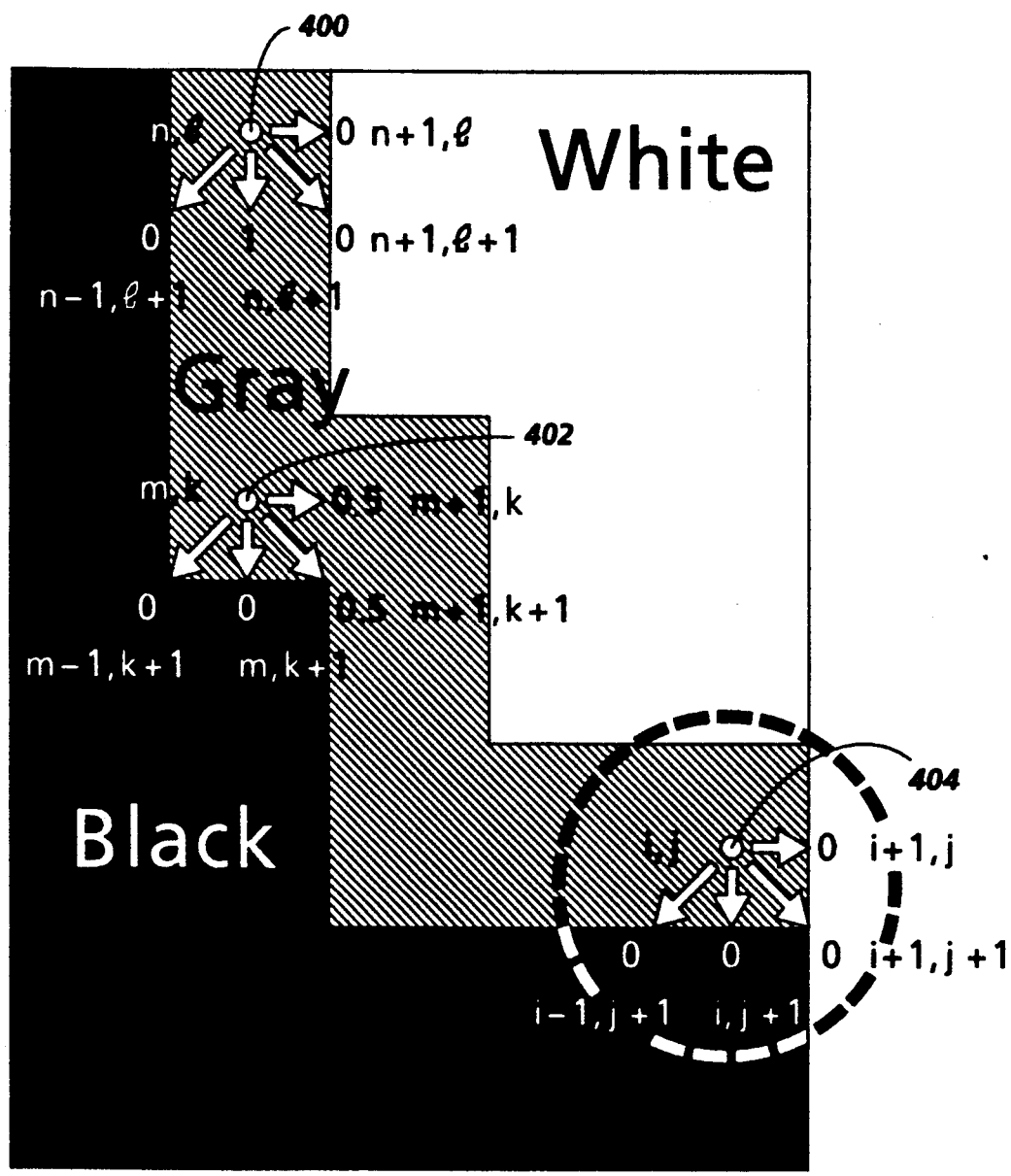
FIG. 3 is a graphical illustration of the inventive process.

With reference now to FIG. 3, there is shown a graphical illustration of the above described method for the case of $L_{n,l}$ and $E_{n,l}$ being identical, in which three image areas are shown, where there are black areas, some gray areas and white areas, as labeled. The example assumes a binary case, having legal values at black and white. Gray pixel 400 at pixel position n,l has an error $\epsilon_{400}$ equal in the present case to a value of "1". The error term $\epsilon_{400}$ will typically be distributed on a weighted basis to pixels at positions n+1,l; n+1,l+1; n,l+1; n−1,l+1. However, in the example, n+1,l; n+1,l+1 and n−1,l+1 are legal values. Accordingly the entire error is directed to pixel n,l+1. In the example of gray pixel 402 at pixel position m,k, an error $\epsilon_{402}$ equals in the present case a value of "1". Error term $\epsilon_{402}$ will typically be distributed on a weighted basis to pixels at positions m+1,k; m+1,k+1; m−1,k+1. However, in the example, m,k+1 and m−1,k+1 are legal values. Accordingly the error is proportionally directed to pixel m+1, k; m+1, k+1. In accordance with the present invention, gray pixel 404 at pixel position i,j has an error $\epsilon_{404}$ equal in the present case to a value of "1". The error term $\epsilon_{404}$ would typically be distributed on a weighted basis to pixels at positions i+1,j; i+1,j+1; i,j+1; i−1,j+1. However, in the example, i+1,j; i+1,j+1; i,j+1;i−1,j+1 are legal values. Therefore, the error is not passed.

Figure 4:
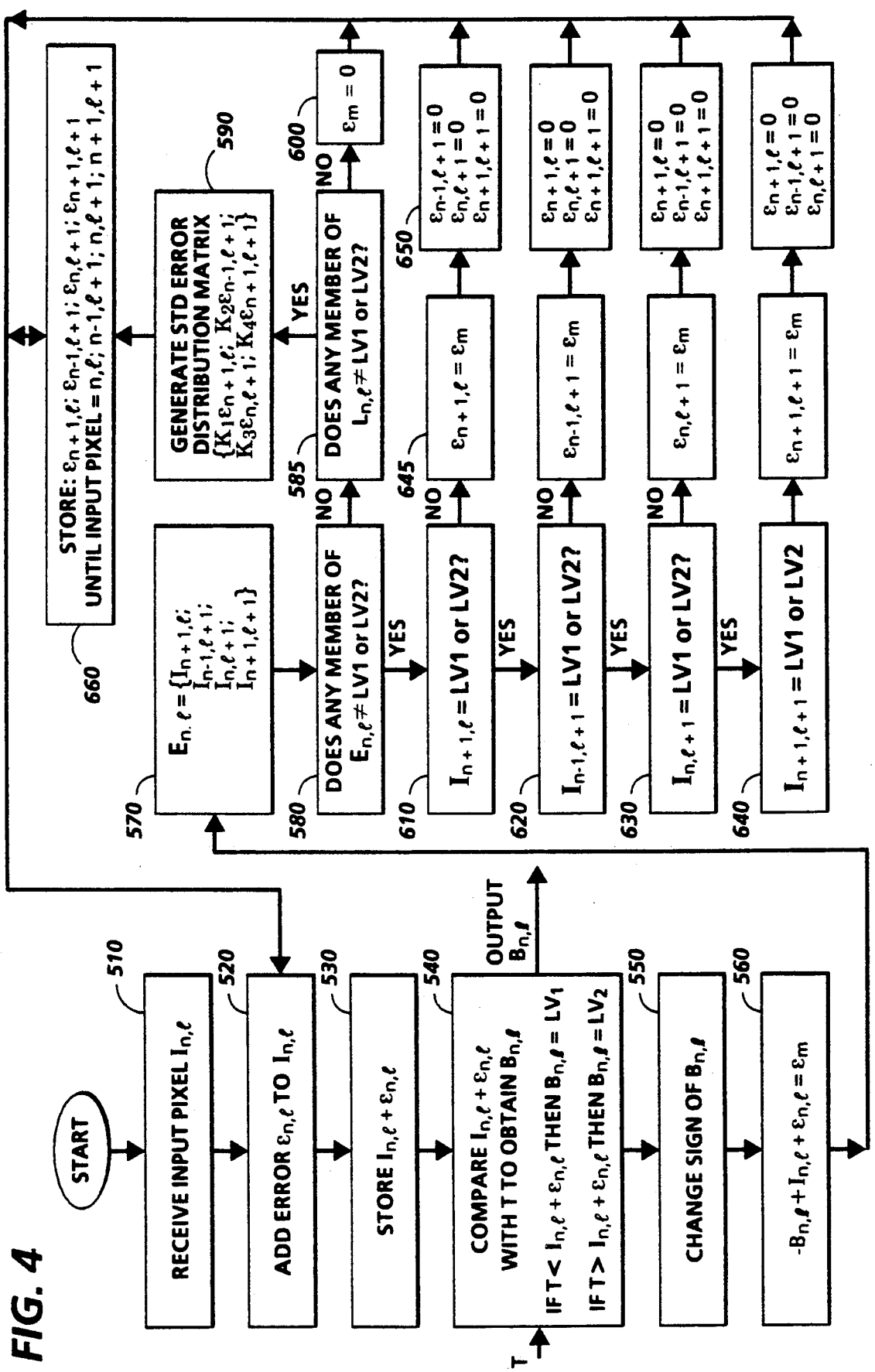
FIG. 4 is a flow chart demonstrating of the first-come, first-serve variation of the present invention.
Figure 5A:
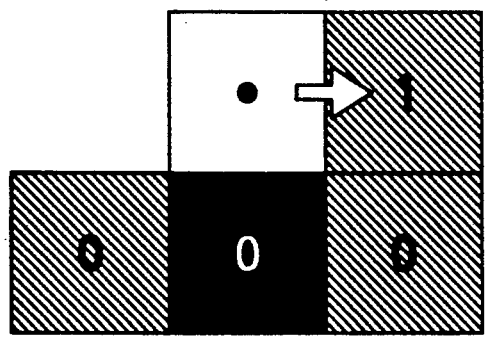
FIGS. 5a–5e illustrate the inventive process of the first-come, first-serve variation of the present invention.
Figure 5B:
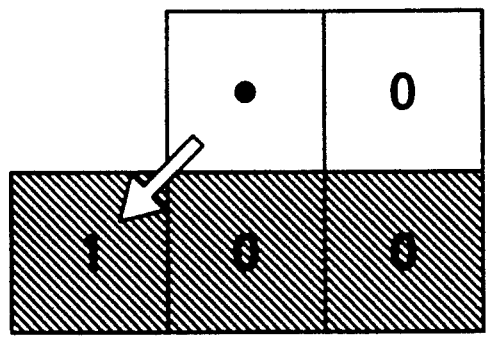
Figure 5C:
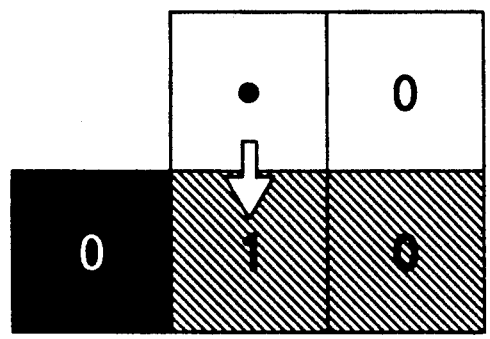
Figure 5D:
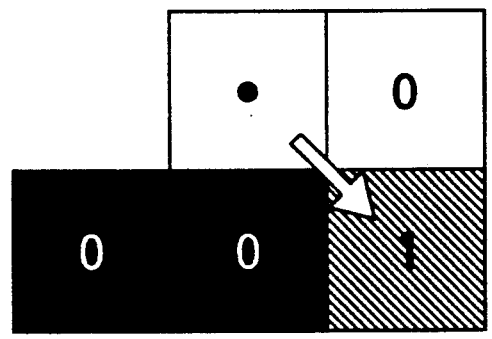
Figure 5E:
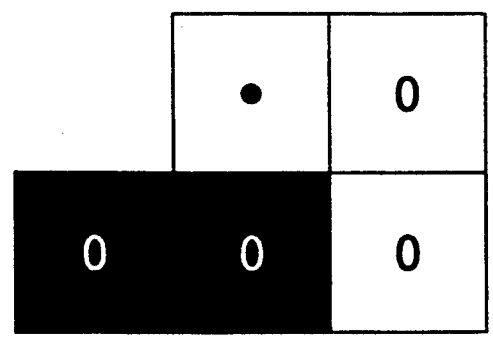

In accordance with another aspect of the invention, a second version of this method is also provided, hereinafter referred to as the first come/first served method of adaptive lossy error diffusion. FIG. 4 shows a flow chart of the process, as used for example in a binary output device, where steps 510, 520, 530, 540, 550, 560 and 570 track the standard error diffusion method of 510) taking an input pixel having a value $I_{n,l}$; 520) adding an error term $\epsilon_{n,l}$ to the pixel value $I_{n,l}$; 530) storing that value $\epsilon_{n,l}+n,l$; 540) thresholding that value to obtain a new output value $B_{n,l}$ and directing $B_{n,l}$ to an output; 550) changing the sign of output value $B_{n,l}$; 560) adding $-B_{n,l}$ to $\epsilon_{n,l}+I_{n,l}$ to obtain the quantizing error $\epsilon_m$, and 570) determining the set of pixels $E_{n,l}$ to which error in the quantization of pixel $I_{n,l}$ is to be directed. At step 580, a determination is made as to whether any of the pixels in the set $E_{n,l}$ have a value equal to $LV_1$ or $LV_2$ where $LV_1$ or $LV_2$ are both values equal to legal output values of an output device. If all of the pixels in the set $E_{n,l}$ have a value equal to $LV_1$ or $LV_2$, at step 585 the set of pixels $L_{n,l}$, usually a larger set of values extending the limits of $E_{n,l}$ as previously discussed, is examined. If this examination shows that any member of the $L_{n,l}$ set has a value different from any of the legal values, a standard error diffusion process is used, and at step 590 quantizing error $\epsilon_m$ is directed to pixels in set $E_{n,l}$ in accordance with a standard error diffusion weighting, $K_1\epsilon_m$ for pixel $I_{n+1,l}$; $K_2\epsilon_m$ for pixel $I_{n-1,l+1}$; $K_3$ $\epsilon_m$ for pixel $I_{n,l+1}$; and $K_4$ for pixel $I\epsilon_{m+1,l+1}$, and stored in the error delay buffer until the appropriate pixel passes the initial error addition position. If all pixels in the $L_{n,l}$ set have legal values $LV_i$, at step 600, the error is reset to zero and no update of the error delay buffer is performed. It will no doubt be appreciated that various error diffusion schemes may be used as standard error diffusion.

At step 580, if a determination is made that any of the pixels in the set $E_{n,l}$ have a value not equal $LV_1$ or $LV_2$, then the value of each pixel is further examined, (at steps 610–640), in order, to determine whether it is equal to $LV_1$ or $LV_2$. When the first pixel value in order of processing in the set is determined not to equal $LV_1$ or $LV_2$, at step 645, the entire error term $\epsilon_m$ is directed to that pixel, and at step 650, the error for the remaining pixels are set to 0. At step 660, these terms (from steps 590, 600, 645 and 650) are stored until the appropriate input pixel passes. Again, $E_{n,l}$ is a subset of $L_{n,l}$ with $E_{n,l}=L_{n,l}$ being the limiting case. This quantizing method is believed to have significant processing advantages over the method of FIGS. 1, 2 and 3. The following Table 1 illustrates the relationship of $E_{n,l}$ and $L_{n,l}$ and the how error is distributed:

TABLE 1

| # | $E_{n,l}$ | $L_{n,l}$ | How error is passed |
|---|---|---|---|
| 1 | $E_{n,l}$ has no legal values | $L_{n,l}$ has no legal values | To first gray pixel |
| 2 | $E_{n,l}$ has no legal value | $L_{n,l}$ has some legal values | To first gray pixel |
| 3 | $E_{n,l}$ has no legal value | $L_{n,l}$ has all legal values | To first gray pixel |
| 4 | $E_{n,l}$ has some legal values | $L_{n,l}$ has no legal values | To first gray pixel |
| 5 | $E_{n,l}$ has some legal values | $L_{n,l}$ has some legal values | To first gray pixel |
| 6 | $E_{n,l}$ has some legal values | $L_{n,l}$ has all legal values | To first gray pixel |
| 7 | $E_{n,l}$ has all legal values | $L_{n,l}$ has no legal values | By predetermined error diffusion |
| 8 | $E_{n,l}$ has all legal values | $L_{n,l}$ has some legal values | By predetermined error diffusion |
| 9 | $E_{n,l}$ has all legal values | $L_{n,l}$ has all legal values | error = 0 no error passed |

FIG. 5 shows the first come/first served method of adaptive lossy error diffusion for $E_{n,l}=L_{n,l}$. In FIG. 5(a), pixel 700 has an error associated with it, that can be directed to pixels at positions n+1,l; n+1,l+1; n,l+1; n−1,l+1. In the example of FIG. 5(a), pixel $I_{n,l+1}$ has a value not equal to any of the legal values, and the total error is forwarded to that pixel without the need to examine future pixels, thus reducing the computational load. In example 5(b), pixel $I_{n+1,l}$ is a legal value. The first gray pixel to be processed in the group is $I_{n-1,l+1}$ without the need to examine future pixels. In example 5(c), pixels $I_{n+1,l}$ and $I_{n-1,l+1}$ are legal values. The first gray pixel to be processed in the group is $I_{n,l+1}$. In example 5(d), pixels $I_{n+1,l}$, $I_{n-1,l+1}$ and $I_{n,l+1}$ are legal values. The first gray pixel to be processed in the group is $I_{n+1,l+1}$. Finally, in example 5(e), pixels $I_{n+1,l}$, $I_{n-1,l+1}$; $I_{n,l+1}$ and $I_{n+1,l+1}$ are all legal values. There are no gray pixels in the group. The error term is set to zero or discarded.

As noted, it will no doubt be appreciated that $E_{n,l}$ may be the same set as $L_{n,l}$. Additionally, while looking at the sets $E_{n,l}$ and $L_{n,l}$ provides a particularly useful result, simply looking at set $E_{n,l}$, and making the determination of directing all the error to the first gray pixel, or discarding the error when there are no gray pixels, may also provide a useful result.

Figure 6:
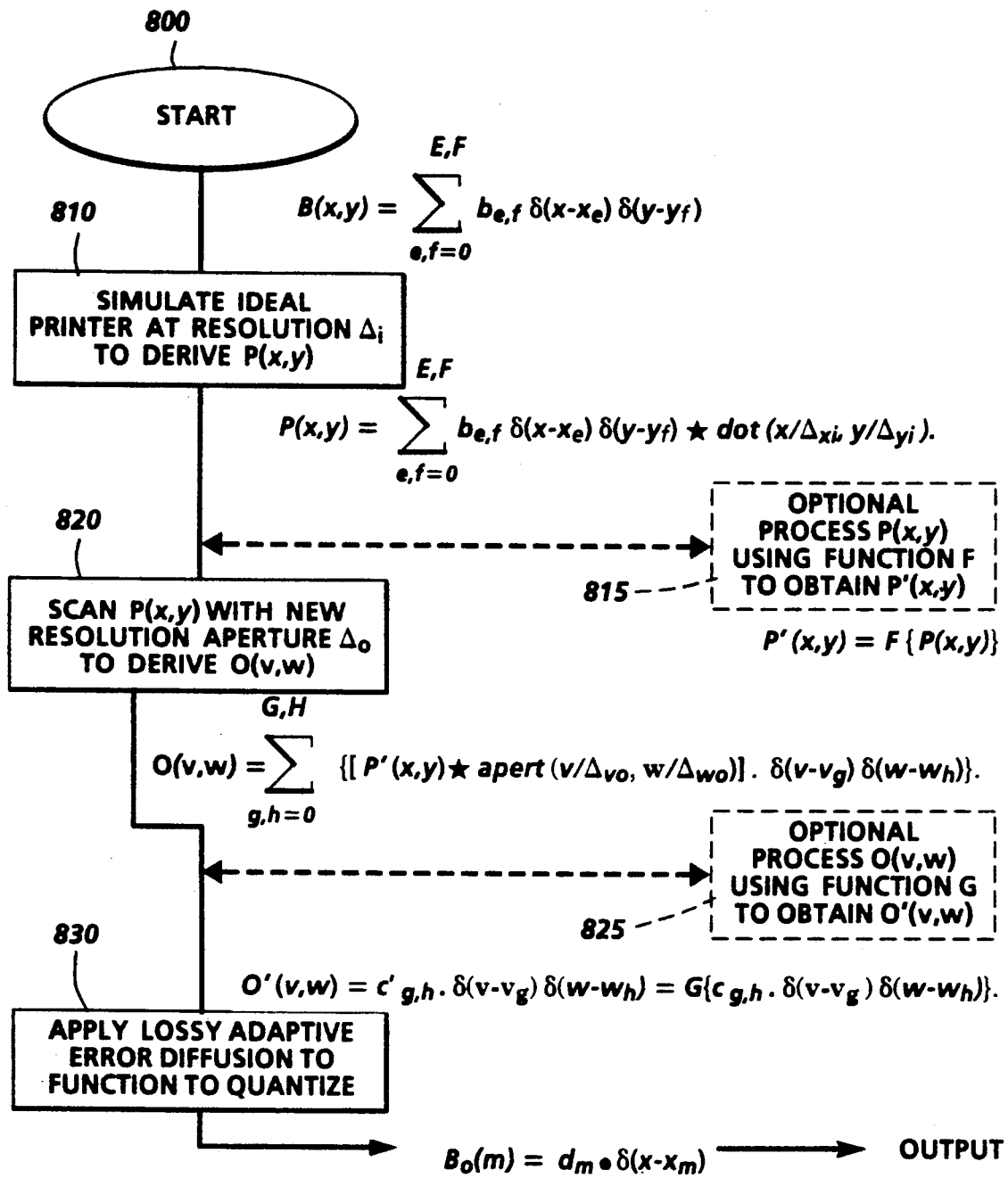
FIG. 6 is an application of the inventive process in an image conversion method.

In accordance with a further aspect of the invention, a software program may be implemented in a general purpose computer operating in accordance with the method described in the flow chart of FIG. 6. In step 800, the method takes a print ready image for conversion. The input bitmap, defined by the function $B(x,y)$ can be described by a series of delta peaks:

$$B(x,y) = \sum_{e,f=0}^{E,F} b_{e,f} \delta(x - x_e) \delta(y - y_f)$$

Where:
$b_{e,f}$ is the value of the bitmap at pixel e,f;
$(x_e, y_f)$ is the location of the discrete set of pixels (e,f);
(x,y) is the spatial coordinate and
E, F are the number of pixels in the bitmap along the different axes.

Ideal printing is simulated at step 810 by attaching the pulses that would be generated by an ideal printer at each delta peak giving the "printed" output. The printmark of the simulated output printer can be denoted by '$dot(x/\Delta_{xi}, y/\Delta_{yi})$', giving the print function $P(x,y)$ as:

$$P(x,y) = \sum_{e,f=0}^{E,F} b_{e,f} \delta(x - x_e) \delta(y - y_f) \star dot(x/\Delta_{xi}, y/\Delta_{yi})$$

Where: $\star$ denotes the convolution operation;
$dot(x/\Delta_{xi}, y/\Delta_{yi})$ describes the mark the printer would generate on paper with the dot-center located at (x, y)=(0,0) and resolution $1/\Delta_{xi}$, $1/\Delta_{yi}$, where the dot may be a real or ideal printer output, including, for example, the characteristic outputs of write-black and write-white printers, elliptical dot printers, etc.;
$P(x,y)$ thus describes the page as it would be generated by a printer having the same resolution as the input bitmap. For simplicity and speed, approximations can be made to $P(x,y)$. One approximation that will be used in the examples is to describe the print-mark as black or white circles of distance (1/resolution), i.e.: 1/300 inch for K=300 spi, 1/400 inch for K=400 spi etc. Note, the description of $P(x,y)$ is continuous in the x,y -axes, while the actual implementation will use a discrete set of x,y -coordinate values sufficient to describe the page with the accuracy needed for the specific application. At step 815 $P(x,y)$ is optionally modified using adjustments of the tone-reproduction-curve or other standard image processing techniques as filtering, giving a modified $P'(x,y)$ described by the function f, in order to compensate for actual printer characteristics, including enhancement or compensation for adjacency effects of two adjacent spots running together:

$$P'(x,y) = F\{P(x,y)\}$$

At step 820, $P'(x,y)$ is "rescanned" with aperture $apert(v/\Delta_{vo}, w/\Delta_{wo})$ that reflects the new resolution and orientation for the desired output and resampled at the new resolution and orientation, so that the output of the scanning function $O(v,w)$ can be defined as:

$$O(v,w) = \sum_{g,h=0}^{G,H} \{[P'(x,y) \star apert(v/\Delta_{vo}, w/\Delta_{wo})] \cdot \delta(v - v_g)\delta(w - w_h)\}.$$

Simplifications can be used, both for the function $apert(v/\Delta_{vo}, w/\Delta_{wo})$, which reflects the scanning aperture and the print dot $dot(x/\Delta_{xi}, y/\Delta_{yi})$ in order to facilitate software or implementation. General scaling functions can be used for the conversion of the bitmap from the first resolution and orientation to the second resolution and orientation that may reflect printer deficiencies or may be used to enhance the print quality. The order of the two convolutions can be changed, and the convolution of $dot(x,y)$ and $apert(v,w)$ can be defined as the combined scaling, so that scaling can be done in one step. $O(v_g, w_h)$ can then be rewritten as:

$$O(v_g, w_h) = c_{g,h} \cdot \delta(v - v_g)\delta(w - w_h),$$

with $c_{g,h}$ being one of the gray levels 'c'. $O(v_g, w_h)$ is then optionally transformed in step 125 by a function G, as given by $$O'(v_g, w_h) = G\{O(v_g, w_h)\}$$

where G can be used to adjust the tone-reproduction curve or enhance or filter the intermediate image, giving $$O'(v_g, w_h) = c'_{g,h} \cdot \delta(v - v_g)\delta(w - w_h) = G\{c_{g,h} \cdot \delta(v - v_g)\delta(w - w_h)\}.$$

Figure 7A:
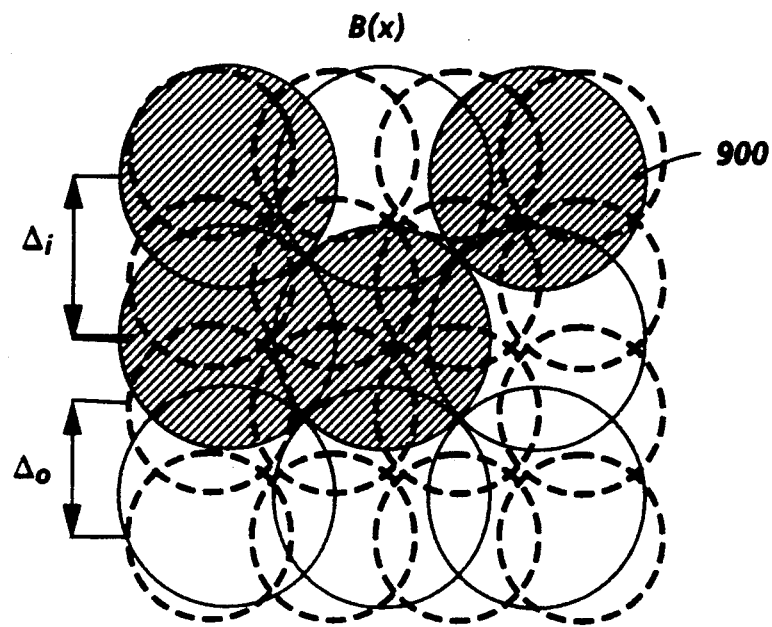
FIGS. 7a and 7b show a step in an image conversion method in which the inventive process finds use.
Figure 7B:
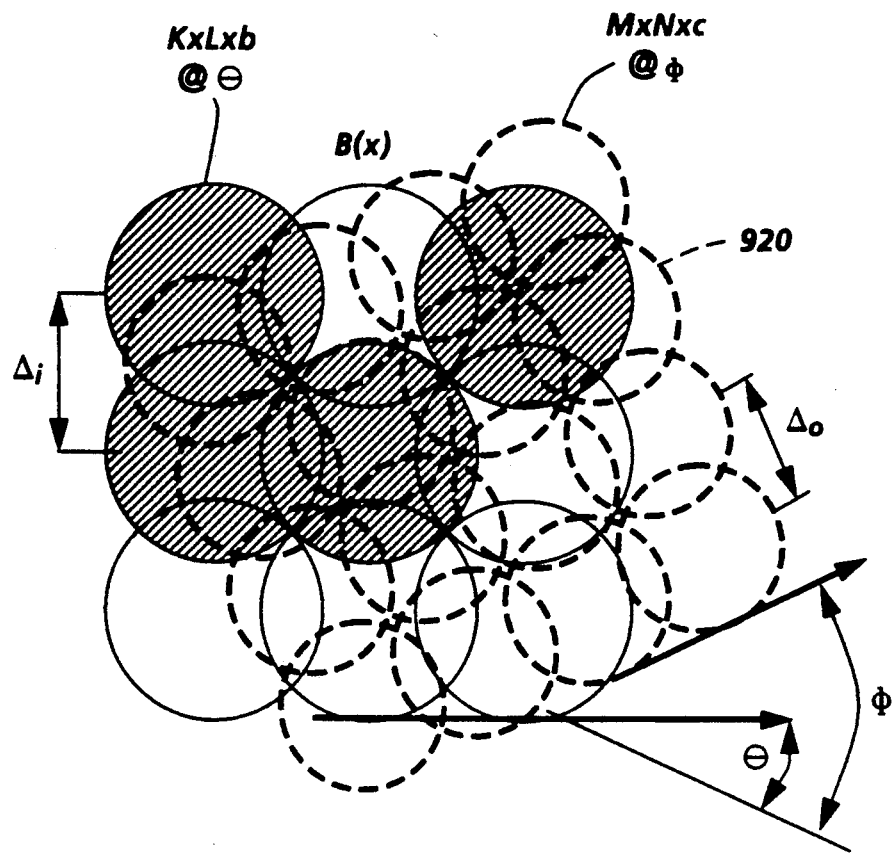

In the following, the approximation of both, $dot(x,y)$ and apert (v,w) as being circles will be used for clarity but the described method is not restricted to this approximation. The mapping function generated by convolving the two circ-functions is shown in FIG. 7A. It can be seen that pixels in portion 900 of function B(x) at a first resolution $\Delta_i$ partially overlap with pixels at a second resolution $\Delta_o$. Thus, pixels at the second resolution have both black and white area coverage within the pixel, that can be considered as gray, where the level of gray, which lies between black and white, is a percentage of the area that is black. In FIG. 7B, there is an illustrative value in the conversion of the bitmap $P(x,y)$, from K×L binary image at orientation $\Theta$, to $O(v,w)$ at orientation $\Phi$, an M×N gray level image 920. The depth 'c' of each pixel is determined by the scaling and/or rotation used, the resolutions involved and the system handling the computation of the amount of gray.

Rotation of images may alternatively be effected using the three shear rotation method described in "A Fast Algorithm for General Raster Rotation", Graphics Interface '86, A. Paeth, p. 77 ff (1986). The input bitmap may be treated as an 8 bit deep image, to produce a gray level output when using standard rotation methods.

The use of simplifications for the dot and/or aperture functions allows for fast algorithms. Other functions can be used, however, in order to reduce graininess, to increase sharpness, or to simulate deficiencies and characteristics. 1-dimensional examples are:

$$\exp(|-x|/\Delta)^2, \frac{2}{1 + e^{(x/\Delta)}}, \text{ and } \exp(|x|/\Delta)$$

without limitation of the invention to the mentioned examples.

As an alternative step 820, an implementation of the above scaling arrangement by table look-up can be achieved in situations where the ratio of the two resolutions is equal to the ratio of two integers (300/400=¾, 240/300=5/6), where the table look-up size is dependent on the integers and small for the ratio of two small integers. Another alternative step 120 for conversions that are not the ratio of two small integers is to scale to a near resolution which can be described as the ratio of two small integers and to adjust for the final, small discrepancy by using a fast interpolation algorithm, with for example a linear interpolation. As an example, a conversion from 300 to 450 (6/9) could thus be achieved by first converting the bitmap from 300 to 400 spi and subsequently scaling it by 1.125 using a linear, cosine, gaussian, or other interpolation function.

With reference again to FIG. 6, at step 830, output O(v,w) generated by the scaling step 120, followed by an optional adjustment 825, has, in general, a number of levels 'c', larger than the desired number of levels d for printing. If an eight bit gray system is used, for example, 256 levels of gray might be generated, dependent on the actual scaling and rotation, which must be reduced to 2 levels, either black or white in a binary printer or display system. The reduction or quantization to the required number is performed using one of the described error diffusion algorithms.

Error diffusion produces individual dots that are normally non-printable. In the present applications this is not true; the output of the scaling operation, for example in the binary case, is "highly" binary which means that a high percentage of the values of O(v,w) are black or white. In general, O(v,w) in this example, consists of black or white areas with few pixels of gray at the boundary between them. The gray areas are attached to black areas and the error diffusion can only produce dots in gray areas, which leads to dots touching the black areas. This phenomenon is similar to the half-bitting for fonts and warrants the printability of the bitmap. The same argument can be used for multilevel bitmaps. The special form of the images generated by scaling and/or rotating print ready bitmaps (as opposed to standard gray scale or continuous tone images) allows images processed with the inventive lossy adaptive error diffusion method to be printed.

The lossy adaptive error diffusion method can easily be extended to an output that is more than 1 bit deep. In this case, the error is only distributed to neighbors that have a value that is not a legal value for the output. For a four level output ('0', '⅓', '⅔', and '1') only pixels with levels unequal to these four levels receive part of the error. When all the pixels to receive error are correct or legal values, the error is discarded.

The invention has been described with reference to a particular embodiment. Modifications and alterations will occur to others upon reading and understanding this specification. It is intended that all such modifications and alterations are included insofar as they come within the scope of the appended claims or equivalents thereof.

We claim:

1. A method of quantizing pixel values in an image formed by a plurality of pixels, each pixel representing an optical density of the image at a location within the image, and having an original optical density value selected from one of a set of 'c' original optical density values that has a number of members larger than a desired output set of 'd' optical density values, the steps comprising:

for each pixel in the image, adding an error term from an error storage buffer for the pixel to the original optical density value thereof to derive a modified optical density value for the pixel;

determining from the modified optical density value of the pixel, an output optical density value from a set of possible output optical density values, each member of the output set of 'd' optical density values selected from a set of legal output values which may be reproduced by an output device;

determining for the pixel an error that is a difference between the determined output optical density value and the modified optical density value;

for each pixel in a predetermined set of neighboring pixels to which the determined error may be added, comparing the original optical density value of each pixel in the set of neighboring pixels to each value of the set of legal output values, identifying pixels that do not have legal values as error recipients, determining a fractional error for each pixel that may receive error, and adding the fractional error in the error storage buffer for subsequent addition of an error term to the original optical density value of each pixel;

for a predetermined set of neighboring pixels in which every pixel in the neighboring set has an original optical density that is a legal value, comparing the original optical density value of each pixel in a look ahead set of pixels, including at least the pixels in the neighboring set of pixels, to each value of the set of legal output values, and if at least one pixel in the look ahead set has a non-legal value, calculating an individual error fraction that is some portion of the error and updating the appropriate error storage buffer for each pixel in the predetermined set of neighboring pixels; and if all the pixels in the look ahead set have legal output values, resetting the error to zero.

2. The method as defined in claim 1, where the second set of pixels is identical to the first set of neighboring pixels.

3. An arrangement for quantizing pixel values in an image formed by a plurality of pixels, each pixel representing an optical density of the image at a location within the image, and having an original optical density value associated therewith selected from one of a set of c original optical density values that has a number of members larger than a desired output set of d optical density values, the quantizing arrangement comprising:

means for inputting a pixel having an original optical density value;

means for adding an error term from an error term buffer to produce for the image pixel a modified optical density value;

means for thresholding the modified optical density value of the image pixel, to produce a output optical density value that is a member of the desired output value set, each member of the output set of d output optical density values selected from a set of legal output values which may be reproduced by an output device;

means for determining an error that is a difference between the output optical density value and the modified optical density value;

means for comparing the original optical density value of each pixel in a first set of neighboring pixels predefined as a set of possible error recipients, to each member of the set of legal output values, and means for allocating a fraction of the determined error to at least one of said neighboring pixels that has an original optical density value not equal to a legal output value;

means to determine if every pixel in the set of possible error recipients has a value equal to any member of the set of legal output values; and means for comparing the original optical density value of each of a second set of neighboring pixels, including at least the members of said first set, to each member of the set of legal output values, and means for setting the determined error to zero, if all pixels of said second set have legal values;

means to allocate error fractions to the first set of neighboring pixels if the second set of pixels contains members having values not equal to any member of the set of legal values; and means for storing in the error term buffer the fraction of the determined error allocated to each neighboring pixel from one or more previous pixels to generate the error term for said pixel.

4. The device as defined in claim 3, where the second set of pixels is identical to the first set of neighboring pixels.

5. A method of quantizing pixel values in an image formed by a plurality of pixels in an ordered arrangement, each pixel representing an optical density of the image at a location within the image, and having an original optical density value associated therewith selected from one of a set of c original optical density values that has a number of members larger than a desired output set of d optical density values, the steps comprising:

for each pixel, adding an error term stored in an error term buffer to the original optical density value to produce a modified image optical density value;

said error term buffer storing multiple error terms, each error term having an accumulated value for addition to original optical density values in the image and corresponding to a single pixel;

applying a threshold level to the modified optical density value of each pixel to produce a new optical density value that is a member of the desired output set, each member of the output set of d optical density values corresponding to one member of a set of legal output values;

determining an error that is a difference between the new optical density value and the modified optical density value;

for a predetermined set of neighboring pixels to which the error may be applied, comparing each member of the set of neighboring pixels set to each legal value in the set of legal values to determine if any member of the set of neighboring pixels has an optical density value equal to a legal value;

establishing a predefined error receiving order of pixels in the predetermined set of neighboring pixels;

upon determining that any pixel in said set of neighboring pixels has an original optical density equal to a non legal value, storing the error to the error term buffer for subsequent addition to the optical density value of a first pixel in said predefined error receiving order having a non-legal value;

upon determining that every pixel in said set of neighboring pixels has an optical density value equal to a legal value, discarding the error.

6. An arrangement for quantizing pixel values in an image formed by a plurality of pixels, each pixel representing an optical density of the image at a location within the image, and having an original optical density value associated therewith selected from one of a set of c original optical density values that has a number of members larger than a desired output set of d optical density values, the quantizing arrangement comprising:

means for inputting a pixel having an original optical density value;

means for adding an error term stored in an error term buffer derived from the quantization of at least one previous pixel to the original optical density value to produce a modified optical density value;

means for thresholding the modified optical density value of the pixel to produce a new optical density value that is a member of the desired output value set, each member of the output set of d new optical density values corresponding to a legal output value that is a member of a set of legal output values which are printable by an output device;

means for determining an error term that is a difference between the new optical density value and the modified optical density value;

comparison means for comparing the original optical density value of each member of a set of neighboring pixels, to each member of the set of legal output values to determine if any neighboring pixel has a non-legal value;

establishing a predefined error receiving order of pixels in the predetermined set of neighboring pixels;

means for storing the determined error term to the error term buffer for subsequent addition to the optical density value of a first pixel in said predefined error receiving order in the neighborhood that has a non-legal value;

means for determining if every neighboring pixel has a legal value; and means for setting the error term stored at the error term buffer to zero upon said legal value determining means determining that every neighboring pixel has a legal value.

7. An arrangement for quantizing pixel values in an image formed by a plurality of pixels, each pixel representing an optical density of the image at a location within the image, and having an original optical density value associated therewith selected from one of a set of c original optical density values that has a number of members larger than a desired output set of d optical density values, the quantizing arrangement comprising:

a source of image data including pixels, each pixel having a value, that is one of c original optical density values and in an image order;

an adder for determining a sum of a first pixel value and an error term derived from the quantization of at least one previous pixel;

a comparator for comparing the sum to at least one reference value, and producing therefrom an output value from the set of d output values, each member of the desired output set of d output values corresponding to a legal value that is a member of a set of legal output values which are printable by an output device;

an error comparator for comparing the output value and the sum, and producing an error term that is the difference therebetween;

a legal value comparator for comparing the value of each member of a set of pixels neighboring said first pixel, to each member of the set of legal values, to determine if any member of the neighboring set has a non-legal output value;

error term memory, for storing at least one error term, and upon determination that any neighboring pixel value is equal to a non legal value, said error term memory directing the error term to the adder to be added to the pixel value of a next pixel in image order in the neighborhood that has a non-legal value;

means for determining if every neighboring pixel has a legal value; and means for setting the error term stored at the error term memory to zero upon said determination means determining that every neighboring pixel has a legal value.

8. A method of quantizing pixel values in an image formed by a plurality of pixels in an ordered arrangement, each pixel representing an optical density of the image at a location within the image, and having an original optical density value associated therewith selected from one of a set of c original optical density values that has a number of members larger than a desired output set of d optical density values, the steps comprising:

adding to each pixel value in an image an error term from the quantization of a pixel previously processed, to produce a modified pixel value;

applying a threshold level to each modified pixel value of each pixel in the image, to produce a new value that is a member of the output set, each member of the output set of d values corresponding to a legal output value which is printable by an output device;

determining an error term that is a difference between the new value and the original pixel value;

for a set of neighboring pixels having a predetermined locational relationship to the thresholded pixel, and to which the error term may be applied, comparing the pixel value of each member of the neighboring set to each legal value;

establishing a predefined error receiving order of pixels in the set of neighboring pixels;

upon a determination that no pixels in said set of neighboring pixels have a pixel value equal to a legal value, applying the error term to the pixel value of the first pixel in said predefined error receiving order of pixels, of said neighboring set;

upon a determination that at least one pixel in said neighboring set of pixels has a pixel value equal to a legal value, for each pixel in the set of neighboring pixels, applying the error term to the original optical density value of the first pixel in said predefined error receiving order of pixels in the set of neighboring pixels having a non-legal value;

upon a determination that every pixel in said neighboring set has a pixel value equal to a legal value, comparing the pixel value of each pixel in a second set of pixels, including at least the first set of pixels, to each member of the set of legal values to determine if any pixel in the second set has a pixel value equal to a legal value;

upon a determination that every pixel in said set of neighboring pixels has a pixel value equal to a legal value, and that at least one member of the second set is determined to have a non-legal value, deriving a set of weighted error terms to be applied to each pixel value in the neighboring set, each weighted error term a preselected portion of the error term, and storing the set of weighted error terms to be subsequently added to the pixel values in the neighboring set prior to applying the threshold level thereto;

upon a determination that every pixel in said neighboring set has a pixel value equal to a legal value, and that every pixel of the second set has a pixel value equal to a legal value, setting said error term to zero.

9. A method of quantizing pixel values in an image formed by a plurality of pixels, each pixel representing an optical density of the image at a location within the image, and having an original optical density value selected from one of a set of 'c' original optical density values that has a number of members larger than a desired output set of 'd' optical density values, the steps comprising:

for each pixel in the image, adding an error term from an error storage buffer for said pixel to the original optical density value of each pixel to derive an input optical density value for each pixel;

determining for the input optical density value of each pixel an output optical density value from a set of possible output optical density values, each member of the output set of 'd' optical density values being a legal output value that is a member of a set of legal output values which are printable by an output device;

determining for each pixel an error term that is a difference between the determined output optical density value and the input optical density value;

for each pixel in a predetermined set of neighboring pixels to which the error term may be applied, comparing the original optical density value of each pixel in the set of neighboring pixels to each value of the set of legal output values, identifying pixels that do not have legal output values as error recipients, and storing the error term in the error storage buffer for subsequent addition of the error term to the original optical density value of at least one pixel having a non-legal value in the set of neighboring pixels; and if all the pixels in the predetermined set have legal output values, resetting the error term to zero.

* * * * *